Oct. 20, 1925. 1,557,893
H. STUKART
BREAD SLICER
Filed July 10, 1922 6 Sheets-Sheet 5

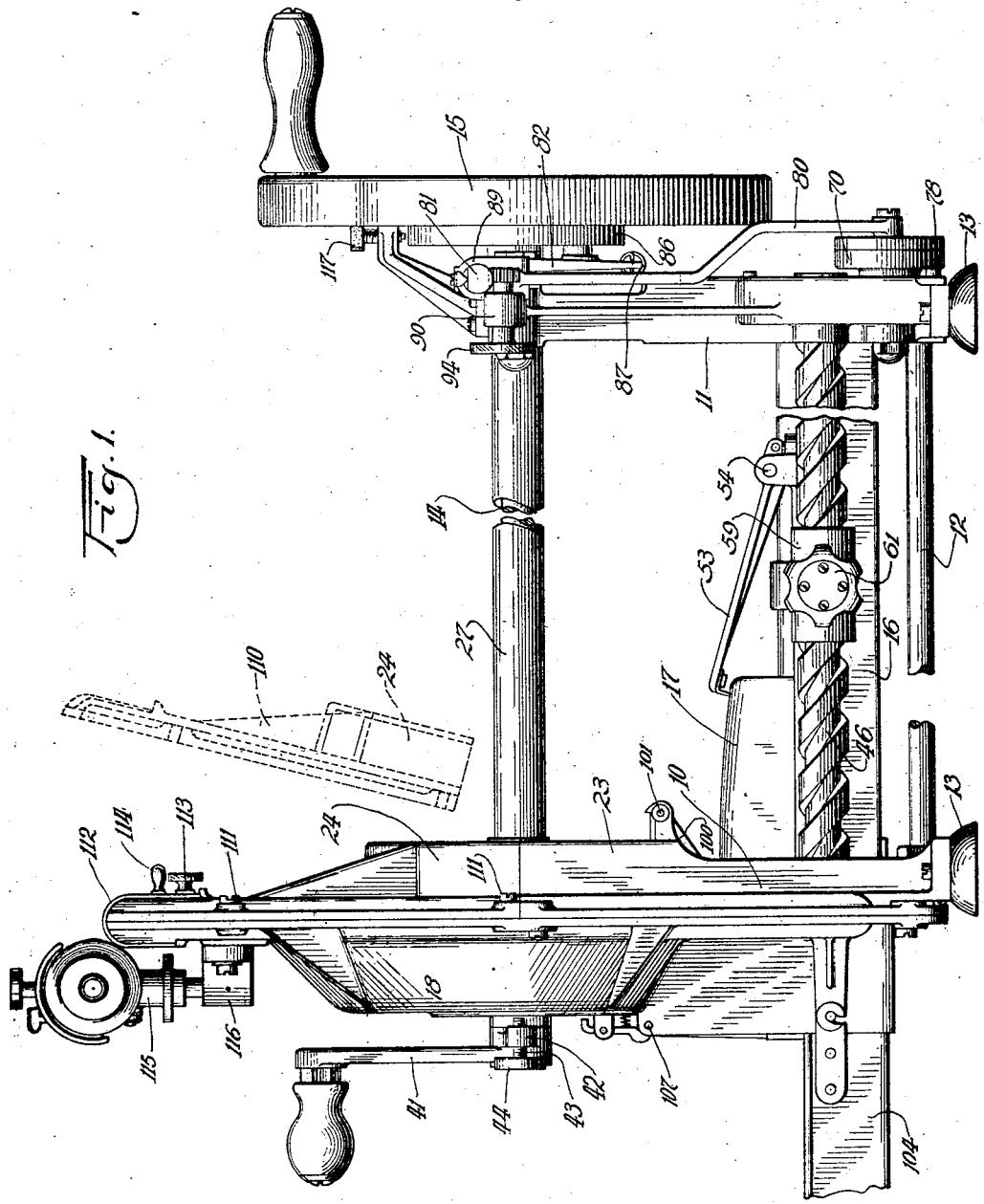

Inventor:
Hendrik Stukart
By Nissen & Crane

Oct. 20, 1925.

H. STUKART

BREAD SLICER

Filed July 10, 1922    6 Sheets-Sheet 6

1,557,893

Inventor:
Hendrik Stukart
By Nissen & Crane, Attys.

Patented Oct. 20, 1925.

1,557,893

UNITED STATES PATENT OFFICE.

HENDRIK STUKART, OF LA PORTE, INDIANA, ASSIGNOR TO U. S. SLICING MACHINE COMPANY, OF LA PORTE, INDIANA, A CORPORATION OF INDIANA.

BREAD SLICER.

Application filed July 10, 1922. Serial No. 573,861.

*To all whom it may concern:*

Be it known that I, HENDRIK STUKART, a citizen of the United States, residing at La Porte, in the county of La Porte and State of Indiana, have invented certain new and useful Improvements in Bread Slicers, of which the following is a specification.

This invention relates to slicing machines having a rotary disc knife for slicing bread and similar substances and has for its object the provision of a machine of the class named which shall be of improved construction and convenient and efficient in operation.

The invention is exemplified in the combination and arrangement of parts shown in the accompanying drawings and described in the following specification, and it is more particularly pointed out in the appended claims.

In the drawings—

Fig. 1 is an elevation of a machine embodying one form of the present invention;

Fig. 2 is a front elevation with parts broken away;

Fig. 3 is a rear elevation with parts in section;

Figure 4:
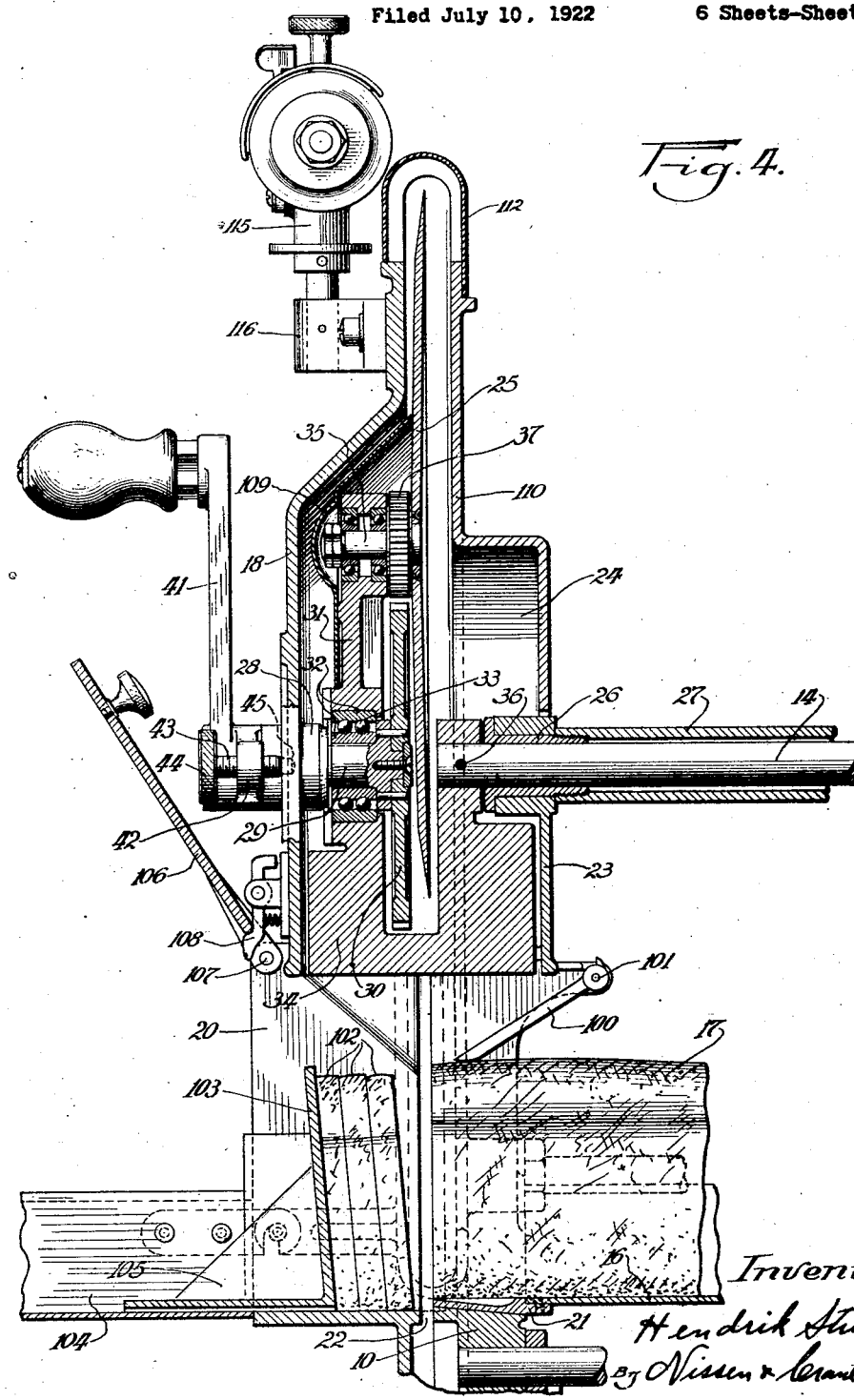
Fig. 4 is a vertical section substantially on line 4—4 of Fig. 2.
Figure 5:
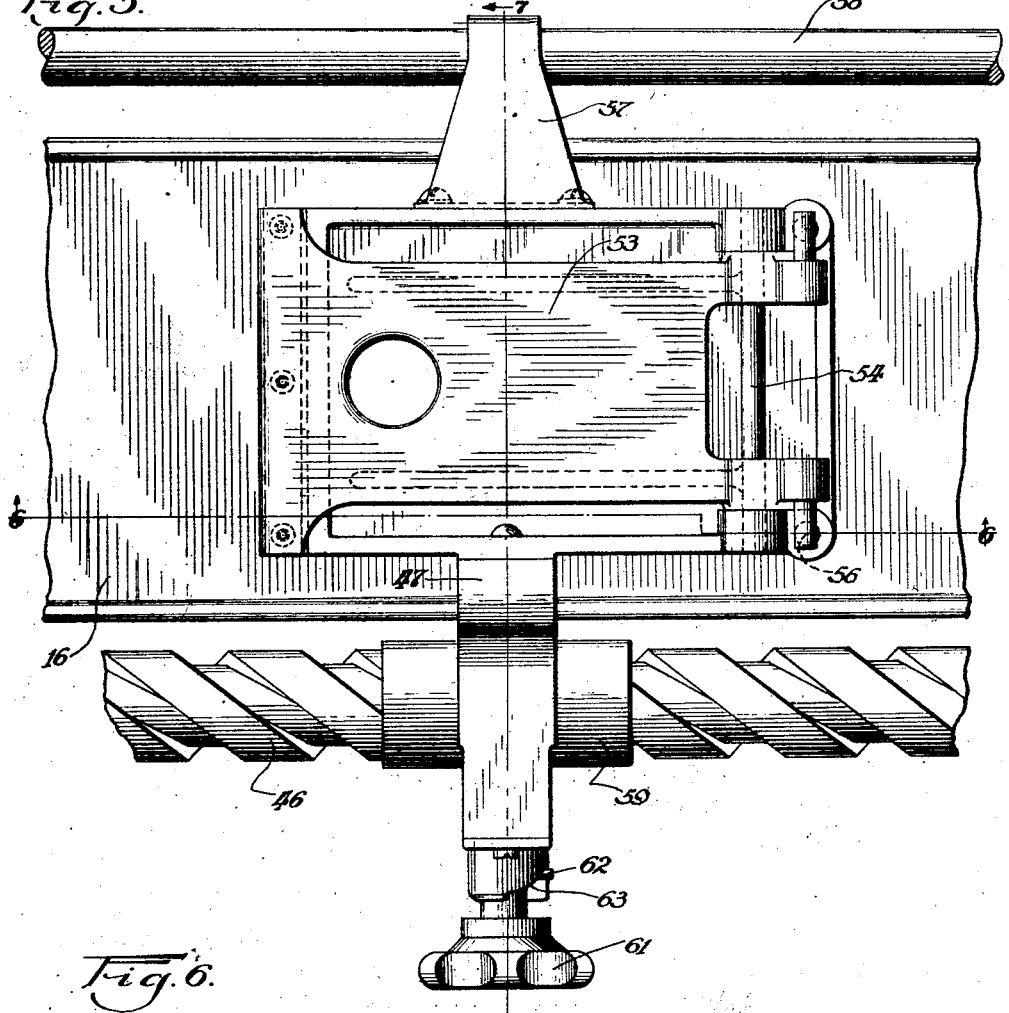
Fig. 5 is a top plan view of the bread clamp and associated parts.
Figure 6:
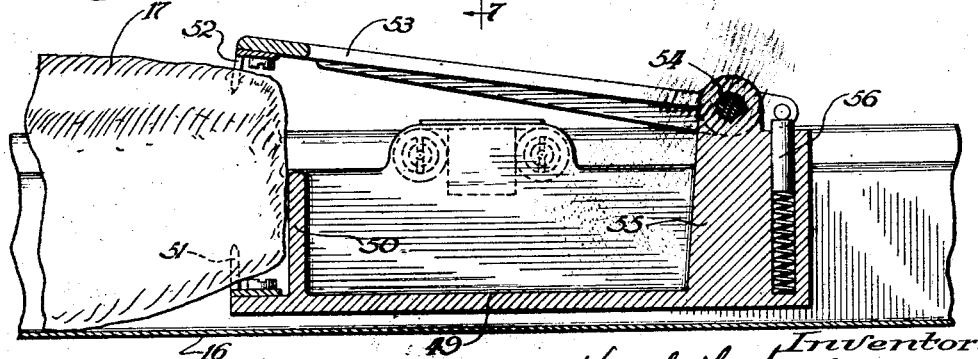
Fig. 6 is a section on line 6—6 of Fig. 5.

The form of slicer shown in the drawings is supported by end plates or frame members 10 and 11 which are held in spaced relation by rods 12 and are provided with feet 13. A main drive shaft 14 is journaled in the supports 10 and 11 and is provided with a drive wheel 15. A runway or channel 16 extends between the supports 10 and 11 along which loaves of bread 17 are fed during the slicing operation.

A circular front plate 18 is secured to the frame 10 by screws 19 and this plate is provided with forwardly extending flanges 20 which surround an opening through the plate at the lower central portion thereof. A similar opening is formed in the frame member 10 and registers with the opening through the front plate. The front end of the channel 16 is provided with a reinforcing member 21 which projects into the opening in the frame 10 and is supported thereby, as shown in Fig. 4. A sufficient space 22 is allowed between the plate 18 and the frame 10 to permit the passage of a knife through the space for severing a slice from the loaf 17. Above the opening for the loaf the frame 10 carries a plate 23 which is spaced from the front plate 18 to provide a chamber 24 in which the driving mechanism for the slicing knife 25 is mounted.

The main drive shaft 14 is pivoted in a bushing 26 mounted in the plate 23 and a spacing sleeve 27 is attached to the bushing 26 and to the rear frame 11. A bearing 28 is formed on the front plate 18 and a stud shaft 29 is journaled in the bearing 28. A spur gear 30 is rigidly fixed on the rear end of the stud shaft 29 and an arm 31 is journaled on the shaft 29 in front of the gear 30. Ball races 32 and ball bearings 33 are interposed between the arm 31 and the shaft 29. Formed integrally with the arm 31 and at the opposite side of the shaft 29 there is provided a U-shaped member 34 which constitutes a driving connection between the shaft 14 and the arm 31 and which also serves as a counterweight for the knife 25 which is mounted on a shaft 35 journaled in the end of the arm 31. The U-member 34 is fixed to the end of the shaft 14 by a pin 36. A pinion 37 is secured to the knife 25 and meshes with an idler 38, Fig. 2, carried by a stud shaft 39. The shaft 39 is journaled in the arm 31 on roller bearings 40 in a manner similar to shaft 35 and meshes with the spur gear 30.

When the hand wheel 15 is rotated in a clockwise direction, as viewed in Fig. 3, it will carry the shaft 35 and the knife 25 in a counter-clockwise direction, as viewed in Fig. 2. This movement will cause the pinion 38 to roll upon the gear 30 which is held stationary during slicing operations so that the pinion 38 will rotate upon its own axis in a counter-clockwise direction, driving the pinion 37 in a clockwise direction. Since the pinion 37 and knife 25 are rigid with one another the lower edge of the knife will move to the left, as viewed in Fig. 4, as the knife is swung down and to the right across the opening for the loaf of bread, as viewed in that figure. This will drive the edge of the knife in the opposite direction to the direction of movement of the knife across the opening so that when the edge of the knife strikes the loaf the rotation will tend to press the loaf downwardly instead of tending to lift it from its support, as would be the case if the knife were rotating in the opposite direction.

For retaining the spur gear 30 in fixed position during a slicing operation the end of the shaft 29 has rigidly secured thereto a hand crank 41 from the hub of which there extends a projection 42 having a screw 43 threaded therein and provided with a thumb wheel 44. The end of the screw may be advanced into an opening 45 in the front plate 18 so that the shaft 29 is rigidly fixed against movement. When the screw 43 is retracted the gear 30 may be rotated by the crank 41 for purpose to be explained later.

Figure 7:
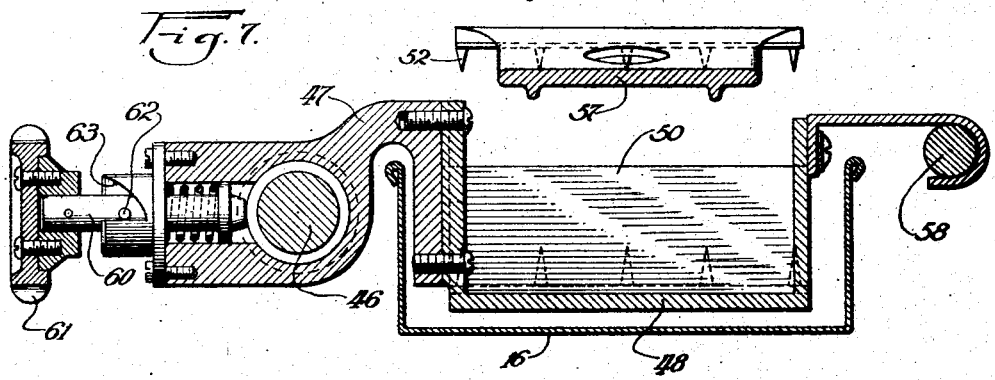
Fig. 7 is a section on line 7—7 of Fig. 5.

The loaf 17 is advanced along the runway 16 by a feed screw 46 located adjacent the side of the runway and connected by a bracket 47, Fig. 7, with a bread clamp 48. The clamp 48 comprises a base plate 49 having an upright abutment flange 50 at its front end and upwardly projecting pins 51 for engaging the lower portion of the loaf. Pins 52 extending downwardly from a clamping plate 53 engage the upper face of the loaf and cooperate with the pins 51 to hold the loaf in the bread clamp. The plate 53 is pivoted at 54 to the rear portion 55 of the clamp and a pair of spring plungers 56 press the teeth 52 into the upper face of the loaf. The substantially horizontal position of the clamping plate 53 permits considerable vertical movement of the teeth 52 without the necessity of any upwardly projecting framework adjacent the rear end of the loaf. Irrespective of the height of the loaf the clamping mechanism projects but very slightly above the top portion of its rear end. A bracket 57 extends from the side of the bread clamp opposite the bracket 47 and slidably engages a rod 58 so that the clamp is supported by the rod 58 and the feed screw 46 in position to be moved along the slideway 16 by the rotation of the feed screw. The bracket 47 is provided with a sleeve 59 which fits the outer periphery of the threads on the screw 46. A spring-pressed plunger 60 is carried by the bracket 47 and the end of the plunger is normally pressed into contact with the threads on the screw 46. A hand wheel 61 is connected with the plunger which carries a pin 62 in position to engage a cam 63 by means of which the plunger may be withdrawn from engagement with the feed screw by rotation of the hand wheel.

The screw 46 carries a ratchet wheel 64 at its rear end which is engaged by detent pawls 65 and 66 to prevent reverse rotation of the ratchet wheel. The points of the pawls 65 and 66 are offset relative to one another an amount equal to one-half of the pitch of the teeth on the ratchet wheel 64 to provide accurate operation of the detents. A pinion 67 is secured to the shaft 46 adjacent the ratchet 64, the pinion meshing with a gear 68 journaled on a stud shaft 69. A disc 70 is secured to the gear 68 by a pin 71 and the two are held in place on the stud shaft 69 by a circumferential flange 72. Journaled upon the periphery of the flange 72 is a disc 73 having recesses 74 formed in the periphery thereof for receiving clutch balls or rollers 75. A flange 76 is formed on the disc 70 and surrounds the plate 73 forming a contact member for the outer periphery of the rollers 75. A spring 77 engages each roller 75 and presses it into the bight between the flange 76 and the inner face of the notch 74.

A cover plate 78 is secured to the plate 73 by screws 79 and a link 80 is pivotally connected at 81 to the cover plate 78. A one-way drive or ratchet is thus provided between the cover plate 78 and the feed screw 46, this drive being operated at each rotation of the hand wheel 15 to impart a partial rotation to the screw 46 and feed the loaf forwardly in the slideway 16. The forward movement of the loaf is timed to take place while the knife 25 is in the upper portion of its casing. The link 80 is reciprocated for moving the feed screw 46 by means of an arm 81 pivoted at 82 on the rear frame plate 11. A finger 83 is connected with the arm 81 and carries a cam roller 84 which engages a cam groove 85 in a cam 86 secured to the hand wheel 15. A spring 87 normally presses the roller 84 inwardly against the inner face of the groove 85. Rotation of the hand wheel 15 periodically moves the roller 84 outwardly lifting the arm 81 and imparting rotation to the cover plate 78 in the direction of the arrow in Fig. 3. The amount of movement of the cover plate and consequently of the feed screw may be regulated by shifting the position of the link 80 along the arm 81.

Figures 8, 9:
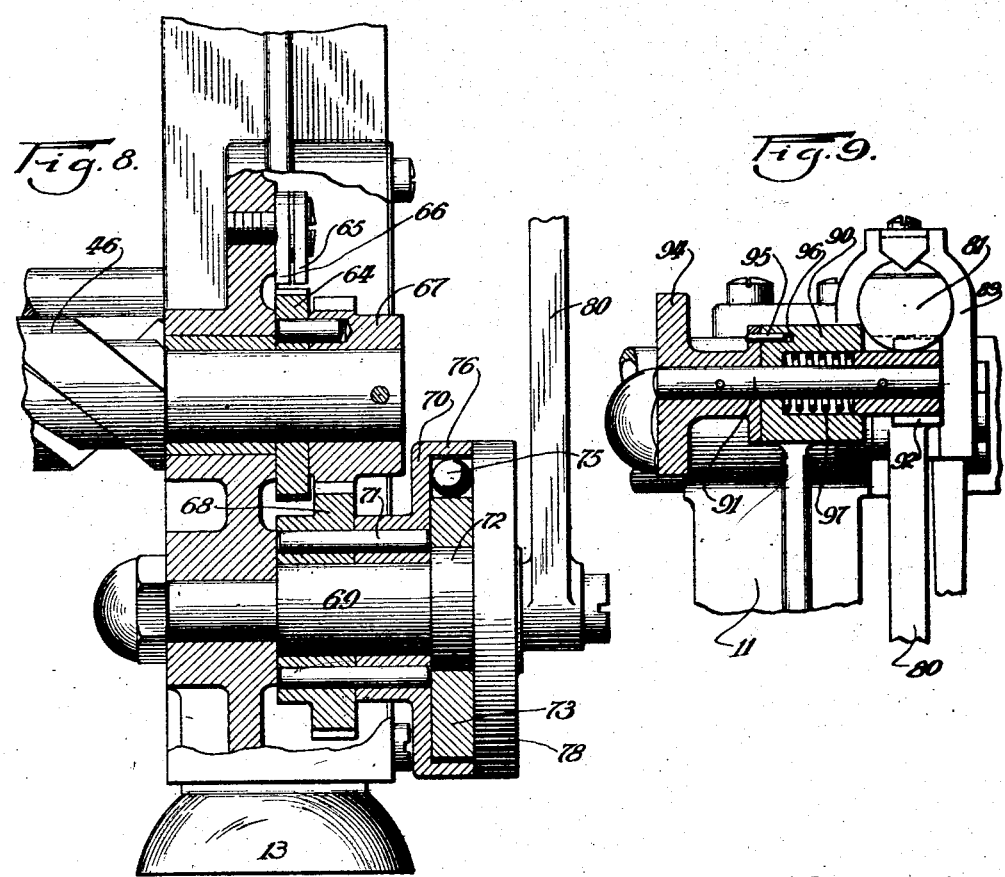
Fig. 8 is a vertical sectional view showing the ratchet feed for the bread clamp.
Fig. 9 is a section on line 9—9 of Fig. 3.

The link 80 is pivotally connected at 88 to a sleeve 89 surrounding the arm 81. The sleeve 89, as shown in Fig. 9, is provided with a housing 90 in which there is journaled a shaft 91 provided with a pinion 92 meshing with gear teeth 93 on the lower face of the arm 81. A hand wheel 94 is connected with the shaft 91 and is held from rotation by a pin 95 which engages openings 96 in the housing 90. A spring 97 normally holds the pin 95 in contact with one of the openings 96. By pulling outwardly on the hand wheel 94 the pin 95 may be disengaged from its opening and the shaft 91 may be rotated to cause the pinion 92 to travel along the rack 93, thus shifting the position of the housing 90 along the arm 81. When the hand wheel is released the spring 97 will again draw the pin 95 into one of the openings 96 and lock the housing 90 in its adjusted position. A scale 98 may be attached to the upper face of the arm 81 and a pointer 99 secured to the housing 90 cooperates with the scale 98 for indicating the thickness of slices corresponding to the various positions of the housing 90 upon the arm 81.

For holding the loaf 17 in place in its slideway 16 a spring plate 100 is pivoted at 101 and presses downwardly upon the loaf 17 adjacent the cutting position. The plate will automatically swing upwardly about its pivot to accommodate loaves of various sizes. The slices 102 as they are severed from the front end of the loaf are held in assembled relation by a supporting plate or follower 103 which moves in front of the slices in a receiving chute 104. A bracket 105 supports the plate in position in the chute. A closure 106 is pivoted at 107 in position to swing downwardly and close the opening through the front plate 18 when the machine is not in operation.

A spring catch 108 is provided for holding the plate 106 in its upper position, as shown in Fig. 4. A guard plate or casing 109 may be secured to the arm 31 and have its edge bear against the knife 25 to form a housing for the operating gearing and prevent crumbs or other matter from access to the gears. A detachable plate 110 closes the rear portion of the upper half of the housing for the knife 25 and is held in place by screws 111 which may be removed to permit access to the interior of the housing. The plates 18 and 110 are cut away at their upper central portion to provide an opening through which the edge of the knife 25 may project for sharpening. This opening may be closed by a cap 112 held in place by a thumb screw 113 and provided with a handle 114 by which it may be moved into the broken line position shown in Fig. 2 when it is desired to permit access to the knife for grinding.

Sharpening of the knife may be performed by a grinder 115 which may be of any approved construction, one suitable form of device for this purpose being shown in Patent No. 1,308,433, granted July 1, 1919. During a sharpening operation the arm 31 is locked in its uppermost position so as to retain the knife 25 at the upper extremity of its movement with the edge projecting into the opening provided at the upper edges of the plates 18 and 110. The sharpener 115 is carried by a bracket 116 in position to cooperate with the knife 25 when locked in its uppermost position. The knife is held in this position by a thumb screw 117, Fig. 3, which may be projected into an opening 118 in the cam member 86 secured to the hand wheel 15. By means of the screw 117 the hand wheel may thus be locked against movement so that the knife 25 will be held in the position shown in Fig. 4. Rotation of the knife in this position is permitted by releasing the thumb screw 43 so that the hand crank 41 may be rotated to drive the shaft 29 and the spur gear 30. This will rotate the shaft 35 and the knife 25 through the action of the idler 38 and pinion 37.

During the grinding operation the stones are brought into proper relation with the edge of the knife in the manner explained in the patent referred to so that the rotation of the knife drives the stones and produces the sharpening operation in the well-known manner referred to in that patent. In this way it is possible to sharpen the knife while it remains mounted in the bearing in which it rotates during the slicing operation. This makes it possible to grind the knife true to its plane of rotation which is difficult to do if the knife is removed from its bearing for sharpening. This operation also avoids the inconvenience of removing the knife for sharpening and subsequently replacing it for slicing.

As shown in Figs. 2 and 4, the cover 109 for the knife gears forms a beveled offset adjacent the cutting portion of the knife. This constitutes a wedge-shaped member which passes between the loaf of bread and the top portion of the slice as it is severed and forces the slice away from the surface from which it has been cut and into the position shown in Fig. 4. This removes the slice from the path of the knife and prevents any chance of mutilation as sometimes might otherwise happen, especially if the knife is rotated after feeding is stopped. It also tips the slice into the proper angle against the previously cut slices and makes it unnecessary for the advancing loaf to move the cut slices.

I claim:—

1. In combination, a disc knife, a support on which said knife is journaled, means for rotating said support to move said knife bodily, means for rotating said knife upon its journal during the movement of said support, means for holding said support in fixed position, means for rotating said knife while still journaled on said support when said support is held in fixed position, and a sharpener for engaging the edge of said knife when so rotated.

2. In combination, a disc knife, a support on which said knife is journaled, means for rotating said support, a gear concentric with the axis of rotation of said support, a pinion meshing with said gear for rotating said knife when said support is rotated, means for holding said gear against rotation during rotation of said support, means for holding said support in fixed position, and means for rotating said gear to drive said knife when said support is so held.

3. In combination, a disc knife, a support on which said knife is journaled, means for rotating said support, planetary gearing for driving said knife during rotation of said support, means for retaining the axis of said knife in fixed position while said knife is journaled on said support, means for actuating said planetary gearing to rotate said knife while the axis thereof remains stationary, and a sharpener for engaging said knife when so rotated.

4. In a slicing machine, a rotary knife, means for revolving the axis of said knife about a fixed axis, planetary gearing for driving said knife, and a hand crank for actuating said planetary gearing to rotate said knife when said revolving means is stationary.

5. In a slicing machine, a disc knife, a support on which said knife is journaled, a journal bearing for said support spaced from the journal bearing for said knife, and a counterbalance for said support and knife.

6. In a slicing machine, a supporting frame, an arm journaled on said frame, a slicing knife journaled on said arm, and a counterbalance connected with said arm at the side of the journal support for said arm opposite said knife.

7. In a slicing machine, a drive shaft, a U-shaped member connected with said drive shaft adjacent one end thereof, an arm connected with said U-shaped member, and a disc knife journaled on said arm and extending between the legs of said U-shaped member.

8. In a slicing machine, a drive shaft, a U-shaped member connected with said drive shaft and extending at one side of the axis thereof, an arm carried by said U-shaped member and extending to the opposite side of the axis of said shaft from said U-shaped member, a disc knife journaled on said arm, and counterbalanced by said U-shaped member, and planetary gearing for rotating said knife when said drive shaft is rotated.

9. In a slicing machine, a drive shaft, an arm connected with said drive shaft, a counterbalance connected with said drive shaft and arranged at the side thereof opposite said arm, a disc knife journaled on said arm and extending past the axis of said shaft into a slot in said counterbalance, and planetary gearing for driving said knife when said shaft is rotated.

10. In a slicing machine, a U-shaped member, a shaft connected with one leg of said member, a journal bearing for the other leg of said member co-axial with said shaft, an arm secured to the last-mentioned leg of said member, and a disc knife journaled on said arm at a point spaced from the axis of said shaft, said knife extending between the legs of said U-shaped member.

11. In a slicing machine, a U-shaped member, a shaft connected with one leg of said member, a journal bearing for the other leg of said member co-axial with said shaft, an arm secured to the last-mentioned leg of said member, a disc knife journaled on said arm at a point spaced from the axis of said shaft, said knife extending between the legs of said U-shaped member, a gear co-axial with said shaft, driving connection between said gear and knife, means for holding said gear against rotation during rotation of said shaft, means for holding said shaft against rotation, and means for driving said gear to rotate said knife when said shaft is so held.

12. In a slicing machine, a work clamp comprising a horizontally extending base member having teeth at the forward edge thereof, an arm pivoted at a point spaced rearwardly from said teeth, downwardly projecting teeth on the forward end of said arm in position to cooperate with said upwardly projecting teeth, and resilient means for moving said arm about its pivot to press the teeth thereon against work held by said clamp.

13. In a bread slicing machine, a slideway for loaves to be sliced, a bread holder movable along said slideway and comprising a base plate having upwardly projecting teeth adjacent the forward edge thereof, an abutment member in the rear of said teeth, a support in the rear of said abutment member, a forwardly projecting clamping arm pivotally mounted on said support and having downwardly extending teeth in registering relation with the teeth on said base plate, a spring for pressing said downwardly projecting teeth into engagement with a loaf of bread, and means for feeding said bread holder along said slideway.

14. In a bread slicing machine, a slideway for a loaf of bread, a clamp for said loaf positioned in said slideway, a guide rod at one side of said slideway, an arm on said clamp engaging said guide rod, a feed screw at the opposite side of said slideway, a bracket on said clamp engaging said feed screw, and a tooth carried by said bracket and movable into and out of mesh with said feed screw.

15. In a slicing machine, a slicing knife, a rotary member for operating said knife, a feed screw for moving material toward said knife, ratchet mechanism for actuating said feed screw, an arm for moving said ratchet mechanism, means operated by said rotary member for oscillating said arm, a slide adjustable along said arm and connected with said ratchet mechanism, and a hand wheel for moving said slide on said arm.

16. In a slicing machine, mechanism for feeding material to be sliced, an arm for actuating said feed mechanism, means for oscillating said arm about a pivotal support, a slide mounted on said arm and connected with said feed mechanism, rack and pinion mechanism for moving said slide along said arm to vary the operation of said feed mechanism, and a hand wheel for operating said rack and pinion.

17. In a slicing machine, a drive shaft having a U-bracket at one end thereof, an arm carried by said bracket, a disc knife journaled on said arm, a pinion connected with said knife for driving said knife, and a gear located in the opening of said U-bracket for driving said pinion.

18. In a slicing machine, a drive shaft, a U-bracket secured to one end of said shaft, a gear arranged co-axial with said drive shaft and positioned in the opening of said bracket, an arm carried by said bracket, a disc knife journaled on said arm and extending into the opening of said U-bracket, the axis of said knife being rotatable about the axis of said drive shaft when said drive shaft is operated, and a pinion connected with said knife, and operated by said gear for rotating said knife about its own axis when said knife is revolved about the axis of said drive shaft.

19. In a slicing machine, a supporting frame having a drive shaft journaled thereon, a U-bracket having one leg thereof secured to one end of said drive shaft, an arm connected with said bracket and extending to the opposite side of said drive shaft, a rotary knife journaled on said arm and counterbalanced by said U-bracket, there being an opening through said arm and U-bracket co-axial with said drive shaft forming a journal bearing for said arm and U-bracket, a support extending through said opening, a gear wheel carried by said support between the legs of said U-bracket, and a pinion connected with said knife and having driving connection with said gear.

In testimony whereof I have signed my name to this specification on this 6th day of July, A. D. 1922.

HENDRIK STUKART.